I. L. SMITH.
AUTOMATIC KEY FOR FEED SHAFTS.
APPLICATION FILED JUNE 29, 1916.

1,224,334.

Patented May 1, 1917.

Ira L. Smith,
Inventor

UNITED STATES PATENT OFFICE.

IRA L. SMITH, OF PINE BLUFF, ARKANSAS.

AUTOMATIC KEY FOR FEED-SHAFTS.

1,224,334.  Specification of Letters Patent.  Patented May 1, 1917.

Application filed June 29, 1916. Serial No. 106,614.

*To all whom it may concern:*

Be it known that I, IRA L. SMITH, a citizen of the United States, and resident of Pine Bluff, in the county of Jefferson and State of Arkansas, have invented certain new and useful Improvements in Automatic Keys for Feed-Shafts, of which the following is a specification.

The present invention relates to machine elements and has particular reference to new and useful improvements in automatic keys for feed shafts and the like.

The primary object of my invention is to provide an automatic connecting key for association with a shaft and a wheel mounted thereon for automatically disconnecting the shaft from the wheel in the event that rotation of the shaft is prevented while the wheel is rotating, which under ordinary circumstances would cause either a mutilation of the ordinary key or a breakage of the shaft or some similar accident.

Another object of my invention is to provide a simple and cheaply constructed automatic key which may be applied to any wheel having a hub portion and to any shaft having the ordinary key-way therein, no structural alteration of the wheel and shaft being necessary, other than to provide means for mounting the automatic key on the wheel.

A further object of my invention is to provide a key of the class described which, while firmly connecting a wheel with a shaft on which the same is mounted, will quickly and automatically disengage itself from the shaft in the event that the wheel should continue to rotate without rotation of the shaft.

Figure 1:
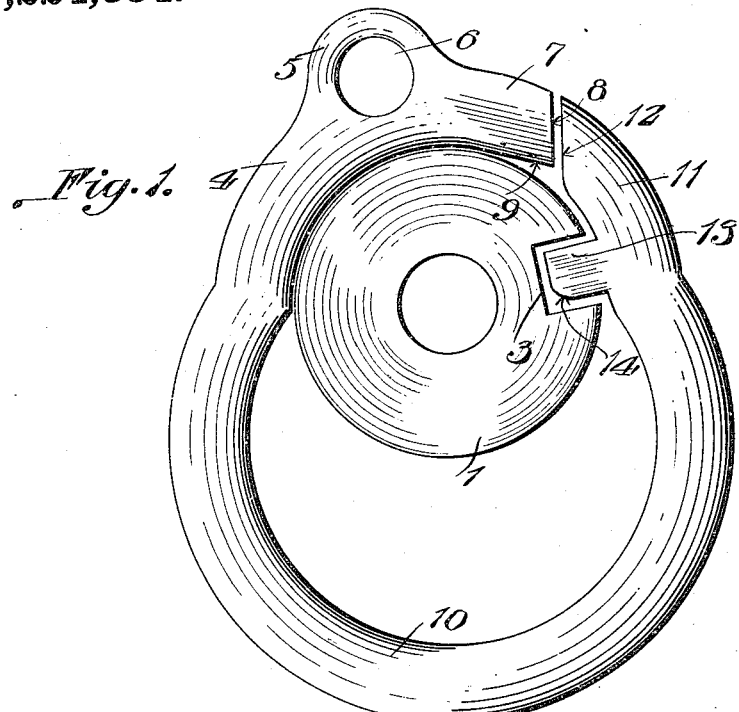
Figure 2:
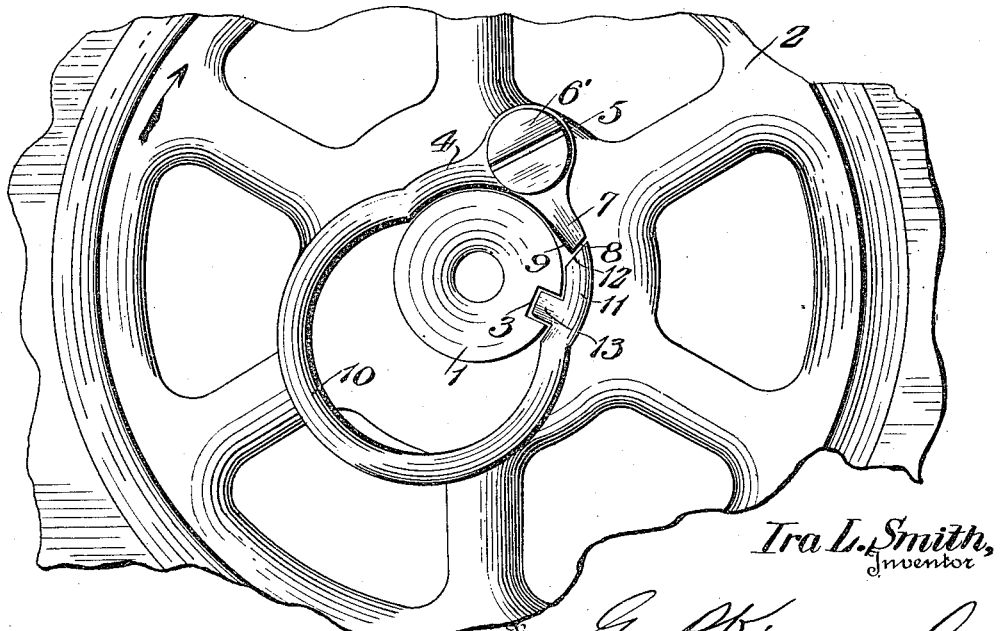

Other objects and advantages to be derived from the use of my improved automatic key will appear from the following detail description and the claims, taken with an inspection of the accompanying drawing, in which:

Figure 1 is a side elevational view of a key embodying the improvements of my invention, the same being shown detached from a wheel and applied to a shaft end; and Fig. 2 is a similar view showing the automatic key applied to a wheel and shaft and in normal position for use.

Referring more particularly to the drawing, wherein similar characters of reference designate like and corresponding parts throughout the various views, 1 designates a shaft, and 2 a wheel mounted on said shaft and adapted for rotation therewith. The wheel 2 may be a gear wheel, a pulley or any other rotative driving element. In the present instance the shaft 1 is to be driven by the wheel 2 and the automatic key of my invention is carried by the wheel and engages with the shaft, said shaft having a longitudinally extending key-way 3 therein. The automatic key of my invention includes in its preferred form, a curved body portion 4 having a curvature conforming to the peripheral face of the shaft 1, said body being provided with an enlargement 5 formed with an aperture 6, through which aperture a screw 6' or other securing element is adapted to pass, said screw being engaged with the wheel 2 or other driving element. The body portion 4 is formed with a tongue 7 formed with a beveled outer face 8 and a beveled inner face 9.

The body 4 is extended to form a bowed portion 10 providing a spring, the free end of said spring being provided with a lip 11 formed with a beveled inner face 12 for engagement, at times, with the beveled outer face 8 of the tongue 7 for a purpose which will hereinafter appear. A lug 13 is mounted on the lip 11 and extends inwardly, said lug being engageable, normally with the key-way 3. The lug 13 is formed with a curved portion 14 removing one of the corners for a purpose which will hereinafter appear.

In use the automatic key of my invention is mounted upon the wheel 2 or a similar driving element, the bowed spring portion 10 thereof encircling the shaft 1 and being engaged therewith by means of a lug 13. In the event that with the continued rotation of the wheel the shaft will cease to rotate owing to some part of the machinery driven thereby meeting with an accident causing the stoppage of the shaft, the continued rotation of the wheel will cause the beveled face 8 of the tongue 7 to engage the beveled face 12 of the lip 11. The spring portion 10 permits this distortion, and upon the engagement referred to the lug 13 will be raised out of the key-way 3 disengaging the wheel from the shaft. The direction of rotation of the wheel when using my invention as shown in the drawing is indicated by the arrow near the rim of the wheel. The beveled inner face 9 is provided to prevent the tongue catching in the key-way.

It will be seen that in the provision of my improved automatic key I have afforded means for transmitting motion from a wheel to a shaft or from any driving element to a shaft, which means will, in an emergency, automatically disconnect the driving element from the driven element. Of course, it is to be understood that I do not limit myself to the use of the device as shown, that is, the shaft may be a trunnion end carried by another wheel or any other rotative machine element. The curved portion 14 permits the lug 13 to move easily and smoothly engage the key-way.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In the combination with a wheel, a shaft, said shaft being provided with a key way, a key member including a spring body portion, said key member being rigidly mounted on the wheel, the free end of the key element having means for engagement with the said key way, said key having means formed integrally therewith for engagement with the said free end for automatically disengaging the key from the key-way upon relative movement of the shaft and wheel.

2. The combination with a shaft having a key-way and a driving element mounted on said shaft, of an automatic key including a curved body portion, said key having an apertured enlargement engaged rigidly with the driving element, said body being also formed with a bow spring portion, the free end of the bow spring portion having a lug for engagement with the key-way and a lip, the body member having a tongue extending therefrom for engagement with said lip to disengage said lug from said key-way.

3. The combination with a shaft, and a driving element mounted thereon, said shaft having a key-way, of an automatic key formed of spring metal, one end of said key being rigidly anchored to the driving element, the free end of the key having a lug for engagement in said key-way, and the anchored end of said key having means for engagement with the free end thereof.

4. The combination with a shaft and a driving element mounted thereon, of an automatic key formed of spring metal, one end of said key being anchored to said driving element, said shaft having a key-way, the free end of said key-way being formed with a lug for engagement in the key-way, the key having a tongue formed adjacent the anchored end thereof for engagement with the free end of said key to raise said lug out of said key-way upon relative movement of the shaft and driving element.

5. The combination with a shaft, and a driving element mounted thereon, said shaft having a key-way therein, of an automatic key including a curved body portion, said body portion being provided with an apertured enlargement, said enlargement being rigidly anchored to the driving element, the anchored end of said body portion having a tongue formed thereon, the said body member having a spring portion formed in continuation thereof, the free end of said spring element being offset to form a lip provided with a beveled face, the lip having a lug formed thereon for engagement in said key-way, and said lip being engageable, at times, with said tongue upon the stoppage of the shaft and the continued rotation of the driving element.

In testimony whereof, I affix my signature hereto.

IRA L. SMITH.

Copies of this patent may be obtained for five cents each, by addressing the "Commissioner of Patents, Washington, D. C."